United States Patent
McBride

[15] 3,676,566
[45] July 11, 1972

[54] LAMINAR STRUCTURES OF POLYIMIDE AND FLUOROCARBON POLYMERS

[72] Inventor: Richard T. McBride, Buffalo, N.Y.
[73] Assignee: E. I. du Pont de Nemours and Company, Wilmington, Del.
[22] Filed: Aug. 18, 1967
[21] Appl. No.: 661,509

Related U.S. Application Data

[63] Continuation of Ser. No. 468,148, June 29, 1965, abandoned, which is a continuation-in-part of Ser. No. 313,079, Oct. 1, 1963, abandoned.

[52] U.S. Cl. .............................174/36, 161/189, 161/213, 161/227, 174/120
[51] Int. Cl. ...................H01b 3/30, H01b 7/34, B32b 27/08
[58] Field of Search ..................161/189, 213, 227; 174/36, 174/110 SR, 110 N, 110 FC, 120 SR

[56] References Cited

UNITED STATES PATENTS

| | | | |
|---|---|---|---|
| 2,344,501 | 3/1944 | Bennett | 174/36 |
| 2,669,695 | 2/1954 | Bird | 174/36 X |
| 2,691,698 | 10/1954 | Schmidt | 174/36 X |
| 2,833,686 | 5/1968 | Sandt | 156/309 |
| 3,030,290 | 4/1962 | Ryan | 204/169 |
| 3,136,680 | 6/1964 | Hochberg | 161/189 |
| 3,115,419 | 12/1963 | Dace | 117/49 |
| 3,168,417 | 2/1965 | Smith et al. | 117/213 |
| 3,179,633 | 4/1965 | Endrey | 260/78 |
| 3,313,676 | 4/1967 | Kamal et al. | 161/189 |
| 3,422,215 | 1/1969 | Humes | 174/120 |
| 3,455,774 | 7/1969 | Lindsey et al. | 161/189 |

*Primary Examiner*—Harold Ansher
*Attorney*—Frank R. Ortolani

[57] ABSTRACT

Laminar structures, electrical conductors therewith and the like composed of polyimide film, fluoropolymer film and thin metal sheet.

3 Claims, 2 Drawing Figures

PATENTED JUL 11 1972                                      3,676,566

INVENTOR
RICHARD T. McBRIDE

BY Donald W. Huntley
ATTORNEY

LAMINAR STRUCTURES OF POLYIMIDE AND FLUOROCARBON POLYMERS

RELATED APPLICATIONS

This application is a continuation of copending application Ser. No. 468,148 filed June 29, 1965, now abandoned, which in turn is a continuation-in-part of Ser. No. 313,079 filed Oct. 1, 1963, now abandoned.

STATEMENT OF INVENTION

The multi-layer structures of this invention can have three, four or five or more layers. It is essential that one of the layers be of a polyimide polymer, a second layer be of a perfluorocarbon polymer, and a third layer be of a thin metal sheet such as aluminum or copper.

In one important embodiment, a three-layer composite structure of this invention has adjacent polyimide/perfluorocarbon/metal layers. This polyimide/perfluorocarbon/metal composite is useful as a shield for electrical conductors. It replaces the woven wire mesh shield and exterior insulation. In the composite, the principal purpose of the metal layer is as an electrical conductor, the polyimide serves as a strengthening member especially at high temperatures and as a support for the weaker metal layer, and the perfluorocarbon serves to bond the two together. The metal layer provides a shield against external electromagnetic fields, thus excluding any external interference and crosstalk between conductors; the metal essentially picks up and drains any external electrical fields. The metal shield may as desired either be grounded, be used as part of the electrical circuit (i.e., "driven"), or not, as required in different applications.

In another important embodiment, a five-layer composite structure has perfluorocarbon/polyimide/perfluorocarbon/metal/perfluorocarbon layers in the indicated order. This laminate is particularly useful in making duct or tubing for carrying various gases and liquids, as this is a heat sealable composite. It is useful for the fabrication of spiral wrapped duct or tube and especially useful for the fabrication of double-layer, crossed-spiral duct or tubing, that is, where the two spirals are right and left hand spirals. In order to improve the flexibility of such duct or tubing, it can be fabricated with crimps or corrugation in the tubing. Without such circular or spiral corrugations the tubing is stiffer and tends to collapse when sharply bent.

Figure 1:
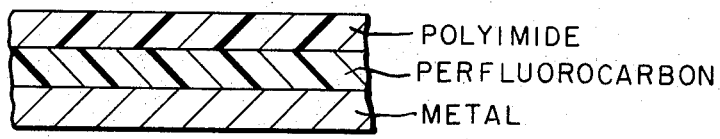
FIGS. 1 and 2 represent specific sheet laminates of the instant invention having three and five layers, respectively.
Figure 2:
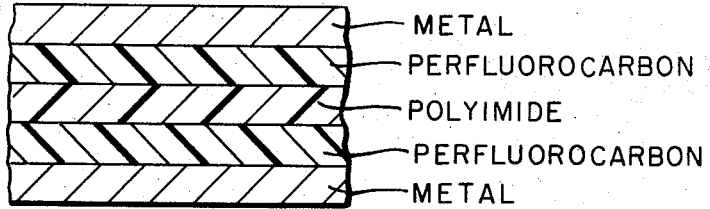

The metal layer of the five-layer composite aids in the formation of the crimps and corrugations in the tube, as folds are more easily retained in the composite when it contains the metal layer. The metal thus contributes to the structure what is termed "dead fold." The metal also serves a second purpose, that of providing a permeability barrier to the gases or liquids being conveyed. The polyimide layer enables the tubing to be used under pressure, and especially confers on it the capability of being used under pressure at temperatures up to as high as 600° C. while resisting bursting. The interior perfluorocarbon layer bonds the polyimide layer to the metal, while the exterior perfluorocarbon layers enable the composite to be heat sealed during subsequent fabrication.

Duct constructed of the five-layer laminate is especially useful in the compressors of air conditioning systems for conveying chlorinated and fluorinated hydrocarbons and other compressible fluids used in such systems. It is also useful for conveying the hot exhaust gases from various types of internal combustion engines. It is further useful as chafing sleeve for various types of hose and tubing to replace metal braid which is normally used in such applications.

In another five-layer embodiment, the layers in turn are metal/perfluorocarbon/polyimide/perfluorocarbon/metal. This product is particularly effective in providing shielding of primary conductors as indicated in the examples hereinafter.

In the laminates of this invention, the metal layer or layers is preferably aluminum but can be copper. The metal sheet can be as thin as a quarter mil or less and as thick as 10 mils or more.

The perfluorocarbon polymer layer or layers is of a resinous copolymer of from 95 percent to 50 percent by weight of tetrafluoroethylene and from 5 percent to 50 percent by weight of hexafluoropropene, the preparation and characteristics of which are described in U.S. Pat. No. 2,833,686 (Sandt). The copolymers of this class containing hexafluoropropene within the weight range of from 7 percent to 27 percent constitutes a preferred group of polymers. The perfluorocarbon polymer film also can vary in thickness from as low as a quarter mil or less to as much as 10 mils or more.

The polyimide layer is preferably a polymer composition of $m$ units of

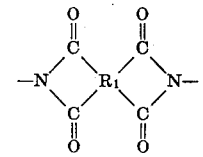

$n$ units of

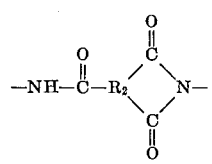

$p$ units of

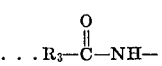

and $q$ units of

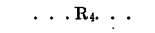

wherein:

a. $R_1$ is an organic tetravalent radical containing at least two carbon atoms, said tetravalent radical being bonded to four carbonyl groups, no more than two carbonyl groups being bonded to any one carbon atom of said tetravalent radical; $R_2$ is an organic trivalent radical containing at least two carbon atoms, said trivalent radical being bonded to three carbonyl groups, no more than two carbonyl groups being bonded to any one carbon atom of said trivalent radical; $R_3$ is a first organic divalent radical, containing at least one carbon atom, said first divalent radical being bonded to one carbonyl group and one nitrogen atom; and $R_4$ is a second organic divalent radical, containing at least two carbon atoms, said second divalent radical being bonded to two nitrogen atoms, the said two nitrogen atoms being attached to different carbon atoms of said second divalent radical;

b. each free — is joined to a . . . bond, and each free . . . bond is joined to a — bond;

c. $m$, $n$, $p$ and $q$ can each assume the value of zero or any integer;

d. $m + n + p + q$ is sufficient to provide a polymer composition having an inherent viscosity of at least 0.1, preferably at least 0.3, as measured as a 0.5 percent by weight solution at 15° C. in fuming nitric acid;

e. $2m$ is greater than or equal to $p$;

f. $m + n = q$.

Inherent viscosity referred to in (d) above is measured at 15° C. at a concentration of 0.5 percent by weight of the polymer in fuming nitric acid. To calculate inherent viscosity, the viscosity of the polymer solution is measured relative to that of the acid alone.

$$\text{Inherent viscosity} = \frac{\text{natural logarithm} \frac{\text{viscosity of solution}}{\text{viscosity of solvent}}}{C}$$

where $C$ is the concentration expressed in grams of polymer per 100 milliliters of solution.

Provision (e) specifies that the number of imide linkages in the polymer chain equals or exceeds the number of amide linkages. This can be seen as follows:

$m$ units containing $R_1$ contain $2m$ imide linkages;
$n$ units containing $R_2$ contain $n$ imide linkages and $n$ amide linkages;
$p$ units containing $R_3$ contain $p$ amide linkages;
($R_4$ units contain neither);
total imide linkages = $2m+n$;
total amide linkages = $n+p$;

thus, for the number of imide linkages to equal or exceed the number of amide linkages, $2m+n$ must equal or exceed $n+p$, or in simpler terms, $2m$ should equal or exceed $p$.

Provision (f) follows from the chemical stoichiometry and is a direct result of provision (b) which requires that the number of — bonds must equal the number of . . . bonds. It indicates that when the polymer is made up of units containing $R_1$ and/or $R_2$, then units containing $R_4$ must also be present; i.e. when the polymer is based on any amount of tri-or tetrafunctional carboxylic acid or functional derivative thereof, it must also then be based on diamine as well. In balancing the — and . . . bonds, the equality $$2m+2n+p=p+2q$$

reduces to the form of provision (f).

The radicals $R_1$, $R_2$, $R_3$ and $R_4$ are preferably aromatic radicals.

Preferably, $R_1$ is a tetravalent aromatic radical, containing at least one carbocyclic or heterocyclic ring, said ring characterized by benzenoid unsaturation, the four carbonyl groups being attached directly to separate carbon atoms in a ring and each pair of carbonyl groups being attached to adjacent carbon atoms in a ring of the $R_1$ radical. Adjacent means ortho or peri, so that the dicarboxylanhydro rings are five- or six-membered, respectively.

It is preferred that the dicarboxylanhydro rings be five-membered rings as follows:

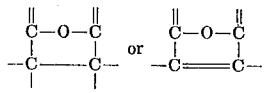

Preferably, $R_2$ is a trivalent aromatic radical, containing at least one carbocyclic or heterocyclic ring; said ring characterized by benzenoid unsaturation, the three carbonyl groups being attached directly to separate carbon atoms, there being a pair of carbonyl groups attached to adjacent carbon atoms in a ring of the $R_2$ radical.

Preferably, $R_3$ and $R_4$ are arylene, that is, they are divalent aromatic radicals, containing at least one carbocyclic or heterocyclic ring, said ring characterized by benzenoid unsaturation, the two substituents being attached directly to separate carbon atoms of the radical.

More specifically, $R_1$, $R_2$, $R_3$ and $R_4$ are selected from the group

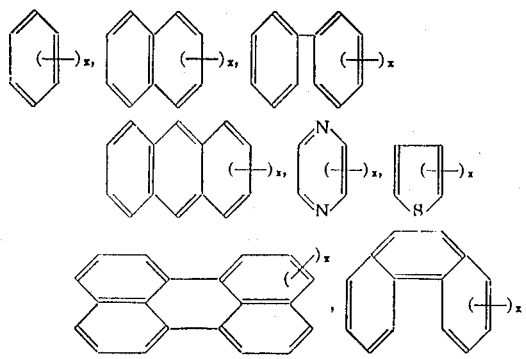

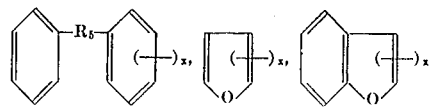

and

wherein $R_5$ is selected from the group consisting of an alkylene chain having 1–3 carbon atoms,

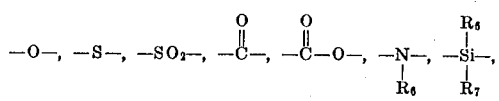

and

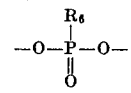

wherein $R_6$ and $R_7$ are alkyl or aryl, and substituted groups thereof.

For $R_1$, $x$ takes the value 4.
For $R_2$, $x$ takes the value 3.
For $R_3$ and $R_4$, $x$ takes the value 2.

In all cases, the $x$ valences can be attached to the same or different rings of the aromatic system.

Illustrative dianhydrides suitable for use in making the polyimides include: pyromellitic dianhydride; 2,3,6,7-naphthalene tetracarboxylic dianhydride; 3,3', 4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride bis(3,4-dicarboxyphenyl) sulfone dianhydride; 3,4,9,10-perylene tetracarboxylic dianhydride; bis(3,4-dicarboxyphenyl) ether dianhydride; ethylene tetracarboxylic dianhydride; naphthalene-1,2,4,5-tetracarboxylic dianhydride; naphthalene-1,4,5,8-tetracarboxylic dianhydride; decahydronaphthalene-1,4,5,8-tetracarboxylic dianhydride; 2,6-dichloronaphthalene-1,4,5,8-tetracarboxylic dianhydride; 2,7-dichloronaphthalene--tetracarboxylic dianhydride; 2,3,6,7-tetrachloronaphthalene-1,4,5,8-tetracarboxylic dianhydride; phenathrene-1,8,9,10-tetracarboxylic dianhydride; cyclopentane-1,2,3,4-tetracarboxylic dianhydride; pyrorolidine-2,3,4,5-tetracarboxylic dianhydride; pyrazine-2,3,5,6-tetracarboxylic dianhydride; 2,2bis(2,3-dicarboxyphenyl) propane dianhydride; 1,1bis(2,3-dicarboxyphenyl) ethane dianhydride; 1,1-bis(3,4-dicarboxyphenyl) ethane dianhydride; -bis(2,3-dicarboxyphenyl) methane dianhydride; bis(3,4-dicarboxyphenyl) methane dianhydride; bis(2,3-dicarboxyphenyl) sulfone dianhydride; benzene-1,2,3,4-tetracarboxylic dianhydride; 1,2,3,4-butane tetracarboxylic dianhydride; thiophene-2,3,4,5-tetracarboxylic dianhydride; 3,4,3', 4'-benzophenone tetracarboxylic dianhydride; 1,1,2,2-ethanetetracarboxylic dianhydride; 2,3,2',3'-benzophenone tetracarboxylic dianhydride; 2,3,3',4'-benzophenone tetracarboxylic dianhydride; bis(3,4-dicarboxyphenyl)sulfide sulfide dianhydride; cyclohexane-1,2,-4,5-tetracarboxylic dianhydride; dimethylcyclobutane-1,2,3,4-tetracarboxylic dianhydride; tricyclo[4,2,2,0$^{2,5}$]-dec-7ene-3,4,9,10 tetracarboxylic dianhydride; etc., and mixtures thereof.

Operable tricarboxylic monoanhydrides are those corresponding to the tetraacids of the above dianhydrides, by replacing any one of the four carboxyl groups by a hydrogen. A highly useful compound of this type is trimellitic acid anhydride. Others illustrative examples are 1,2,6-naphthalene tricarboxylic acid anhydride and 3,3', 4-diphenyl tricarboxylic acid anhydride.

Among the diamines which are suitable for use in making the polyimides are: meta-phenylene diamine; para-phenylene diamine; 4,4'-diamino-diphenyl propane; 4,4'-diamino-diphenyl methane; benzidine; 4,4'-diamino-diphenyl sulfide, 4,4'-diamino-diphenyl sulfone; 3,3'-diamino-diphenyl sulfone, 4,4'-diamino-diphenyl ether; 2,6-diamino-pyridine; bis-(4-amino-phenyl)-diethyl silane; bis-(4-amino-phenyl) diphenyl silane; bis-(4-amino-phenyl)-N-methylamine; 1,5-diamino naphthalene; 3,3'-dimethyl-4,4'-diamino-biphenyl; 3,3'-dimethoxy benzidine; 2,4-bis(beta-amino-t-butyl) toluene; bis-(para-beta-amino-t-butyl-phenyl) ether; para-bis(2-methyl-4-amino-pentyl) benzene; para-bis(1,1-dimethyl-5-amino-pentyl)benzene; m-xylylene diamine; p-xylylene diamine; bis(para-amino-cyclohexyl) methane; hexamethylene diamine; heptamethylene diamine; octamethylene diamine; nonamethylene diamine; decamethylene diamine; 3-methylheptamethylene diamine; 4,4-dimethylheptamethylene diamine; 2,11-diamino-dodecane; 1,2-bis-(3-amino-propoxy) ethane; 2,2-dimethyl propylene diamine; 3-methoxy-hexamethylene diamine; 2,5-dimethylhexamethylene diamine; 2,5-dimethylheptamethylene diamine; 5-methyl-nonamethylene diamine; 1,4-diamino-cyclohexane; 1,12-diamino-octadecane; 2,5-diamino-1,3,4-oxadiazole; $H_2N(CH_2)_3S-(CH_2)_3NH_2$; $H_2N(CH_2)_3N(CH_3)(CH_2)_3NH_2$; 3,3'-dichlorobenzidene; bis-(4-amino-phenyl) ethyl phosphine oxide; bis-(4-amino-phenyl) phenyl phosphine oxide; bis-(4-amino-phenyl)-N-phenylamine; 4,4'-diaminobenzophenone; 3,3'-diaminobenzophenone; 3,4'-diaminobenzophenone; 4-aminophenyl 3-amino-benzoate; and mixtures thereof.

Operable aminoacids include m-aminobenzoic acid; p-aminobenzoic acid, glycine, and in general, any aminoacid corresponding to the above diamines where one of the two amino groups is replaced with a carboxyl group.

The polyimide film layer also can vary in thickness from as low as a quarter mil or less to as much as 10 mils or more.

It is preferred that the polyimide film have a moisture content of no greater than 1 percent by weight, and preferably no greater than 0.5 percent by weight, during preparation of the laminates of this invention.

The laminate of this invention can be prepared by any convenient method.

One useful method for improved adhesion involves the treatment of the perfluorocarbon film surfaces by an electrical discharge and the use of a polyalkylenimine as an adhesion promoter. Briefly, the process comprises, in combination, the sequential steps of (1) subjecting the perfluorocarbon surface to the action of an electrical discharge between spaced electrodes at substantially atmospheric pressure in a substantially oxygen gas-free atmosphere containing less than about 5 percent by volume of the vapor of a non-oxidizing organic compound having a vapor pressure of at least 0.25 mm. of mercury at a temperature of 60° C. in a gaseous carrier such as nitrogen or carbon dioxide, the energy of the electrical discharge being below 15 electron volts and (2) thereafter applying to the treated surface between 15 and 450 milligrams per square meter of a polyalkylenimine such as polyethylenimine or polypropylenimine. The lamination can be carried out in a press at an elevated temperature such as 240° to 280° C. and a pressure of about 10 pounds per square inch or greater for a period of 1 second or more up to several minutes. This procedure is fully described in patent application Ser. No. 313,079 filed Oct. 1, 1963 in the name of Richard T. McBride, now abandoned, and his continuation-in-part application thereof, Ser. No. 465,608 filed June 21, 1965, now abandoned, the disclosures of which are hereby incorporated by reference.

A preferred method of preparing the laminates of this invention is described in patent application Ser. No. 468,140 filed on June 29, 1965, in the names of William B. Lindsey and Mark M. Locey, now abandoned, the disclosure of which is also incorporated by reference. In the Lindsey and Locey process, a polyimide film and a cementable perfluorocarbon film are brought together, heated at 240°–280° C. at a pressure of over 10 pounds per square inch for at least 0.01 second, and then given a second heat treatment at 350°–500° C. for at least 1 second. This technique is used as appropriate throughout the preparation of the entire laminate, as described by Lindsey and Locey. The "cementability" of the perfluorocarbon film is obtained by an electrical discharge treatment under specific conditions described by McBride and Wolinski in patent application Ser. No. 282,947 filed May 24, 1963, now U.S. Pat. No. 3,296,011.

The following specific Examples are not intended for limitation and will serve to further illustrate the principles and practices of this invention. Parts and percentages are by weight unless otherwise indicated.

EXAMPLE 1

A laminate consisting of a 1-mil thick polyimide film combined with a cementable 0.5 mil thick film of a copolymer of tetrafluoroethylene and hexafluoropropylene is prepared by bringing together the polyimide film and the cementable perfluorocarbon film with the cementable side of the perfluorocarbon film toward the polyimide film passing the composite between a rubber pressure roll and a heated drum in a continuous manner using a pressure of 200 pounds per square inch and a temperature of 245° C. The polyimide is that based on pyromellitic acid and 4,4'-diaminodiphenyl ether. The "cementable" treatment is according to McBride and Wolinski referred to above. This polyimide/perfluorocarbon film laminate is then passed through a heating chamber where it is heated to 450° C. for 10 seconds. The perfluorocarbon side of the laminate is subjected to an electrostatic discharge-glycidyl methacrylate treatment according to McBride and Wolinski to impart cementability to the perfluorocarbon surface, as described above. A three-layer laminate is made next by adhering to the perfluorocarbon surface a 1 mil thick aluminum foil at 240° C. at a pressure of 300 pounds per square inch.

EXAMPLE 2

A laminate consisting of 1 mil thick polyimide film/1 mil thick perfluorocarbon film/1 mil thick aluminum foil is prepared by bringing together the polyimide film, two-side cementable perfluorocarbon film and aluminum foil, passing the composite between a rubber pressure roll and a heated drum in a continuous manner using a pressure of 200 pounds per square inch and a temperature of 245° C. The three ply laminate is then passed through a heating chamber where it is heated to 450° C. for 20 seconds. The heat seals are improved by a factor of five by the post heat treatment.

EXAMPLE 3

A perfluorocarbon/polyimide/perfluorocarbon laminate is prepared in one pass through a nip roll laminator. The first perfluorocarbon film is 0.5 mil thick, the second perfluorocarbon film is 0.5 mil thick, and the polyimide film is 1 mil thick. The perfluorocarbon is a copolymer of tetrafluoroethylene and hexafluoropropylene. The polyimide is that based on pyromellitic acid and 4,4'-diaminodiphenyl ether. The two perfluorocarbon films each have one cementable surface, which in each case is placed into contact with the polyimide film. The films are bonded at 240°–250° C. at a pressure of about 300 pounds per square inch for about 0.06 second. Samples of this laminate are then heated, one for 60 seconds at 464° C., a second for 30 seconds at 460° C., a third for 12 seconds at 450° C., a fourth for 60 seconds at 420° C. and a fifth for 30 seconds at 405° C. The samples are then treated as described hereinabove to make one surface cementable. An 0.5 mil perfluorocarbon/1 mil polyimide/0.5 mil perfluorocarbon/3 mil aluminum/0.5 mil perfluorocarbon laminate is then prepared by bringing the cementable side of the perfluorocarbon/polyimide/perfluorocarbon laminate into contact with the 3 mil aluminum, while simultaneously bringing the cementable side of an 0.5 mil perfluorocarbon film into contact with the second side of the aluminum, in a nip roll laminator at 240° C. at a pressure of about 400 pounds per square inch. A similar laminate is also prepared where the polyimide is 2 mils thick.

EXAMPLE 4

A mandrel having a 3 inch diameter and 30 feet long is spirally wrapped with a tetrafluoroethylene skived tape to provide it with a release surface. Then a 2 inch wide 0.5 mil perfluorocarbon/1 mil polyimide/0.5 mil perfluorocarbon/1 mil aluminum/0.5 mil perfluorocarbon laminate is tightly wrapped in a spiral upon the tetrafluoroethylene skived tape with a 50 percent (distance) overlap on each turn, with the aluminum layer toward the inside and the polyimide layer toward the outside, and so as to leave both ends of the tetrafluoroethylene skived tape accessible. A second tetrafluoroethylene skived tape is then tightly wound over the structure. The entire assembly is placed in a forced draft oven at 260° C. for about 30 minutes, permitting the thermal expansion of the assembly to force out any air which was trapped between the various layers of the assembly. The oven temperature is raised to about 300° C. (a temperature above the fusion point of the perfluorocarbon fluoropolymer but below that of the tetrafluoroethylene fluoropolymer) and held at this temperature for about 1 hour, until the spirally wrapped laminate has fused to itself (at this temperature, the perfluorocarbon will not adhere to the tetrafluoroethylene as the tetrafluoroethylene polymer does not melt). The assembly is cooled in a ventilated atmosphere, and the mandrel and tetrafluoroethylene skived tapes are removed, leaving the 3 inch diameter spiral tube intact.

EXAMPLE 5

Example 4 is repeated except that after winding the first spiral wrap of perfluorocarbon/polyimide/perfluorocarbon/aluminum/perfluorocarbon laminate, a second spiral of the same laminate is similarly wound upon it in a reverse spiral (i.e., the opposite "hand"). The outer tetrafluoroethylene skived tape is then wound, and the assembly treated in the same way. The tubing formed is a double spiral having substantially greater structural strength than that of Example 4.

It will be clear that tubes of greater and smaller diameter and/or length can be fabricated in the same way, that the thickness of the various layers of the laminate may be varied to give tubing suitable for different applications, that the width of laminated film which is employed may be greater or smaller, and that operating conditions such as heating times will vary depending on the heating capacity of the oven, the size of the mandrel, the thickness of the laminate, etc.

EXAMPLE 6

A bundle consisting of a) a twisted pair of nickel plated copper primary conductors (American Wire Gauge No. 22), each covered with polyimide/perfluorocarbon insulation, and b) a silver coated copper drain (i.e., ground) wire (American) Wire Gauge No. 22) is overwrapped spirally with a one-quarter inch wide 1 mil polyimide/0.5 mil perfluorocarbon/0.5 mil aluminum laminate, with a 50 percent (distance) overlap on each turn, and with the aluminum layer toward the inside. The aluminum side of the laminate contacts the drain wire which serves to short successive turns of the aluminum foil, thus precluding an inductive effect, and which serves to provide an easy termination of the aluminum shield to ground; the aluminum shield prevents the primaries from picking up extraneous signals. A jacket is applied over the shielded bundle to provide mechanical and electrical protection by wrapping spirally with a one-quarter inch wide heat-sealable 1 mil polyimide/0.5 mil perfluorocarbon laminate. For a given length of conductor, there is substantial saving in weight for this cable when compared with a similar cable shielded with braided wires.

EXAMPLE 7

A cable is fabricated as in Example 6, except that it consists of the drain wire and only a single primary conductor in place of the twisted pair. For 1,000 feet of cable, approximately 0.5 pound of the polyimide/perfluorocarbon/ aluminum laminate is required to provide the shield. A similar cable fabricated with a braided silver coated copper wire (American Wire Gauge No. 36) sheath requires approximately 3.5 pounds of wire to provide the shield for 1,000 feet of cable. The substantial difference in weight is very significant in some uses.

In Examples 6 and 7, fabrication of the laminate shielded cable is easier and requires less complicated machinery then required in fabricating a cable with braided shield. In these examples, it will be clear that each primary conductor and drain wire can be of any gauge desired, may if desired be solid or stranded, and can be fabricated from any electrically conductive metal, optionally coated with a second metal; that bundles containing primary conductors numbering into the hundreds may if desired be fabricated into similar shielded cables; that more than one drain wire may if desired be used; and that the width of the laminate tape used for wrapping the spiral shield will vary, depending on the number and gauge of the primary conductors and drain wires.

EXAMPLE 8

An 0.5 mil perfluorocarbon/1 mil polyimide/0.5 perfluorocarbon laminate is prepared as described in Example 3. It is then treated as described hereinabove to make both surfaces cementable. An 0.5 mil aluminum/0.5 mil perfluorocarbon/1 mil polyimide/0.5 mil perfluorocarbon/0.5 mil aluminum laminate is then prepared from the two-side cementable laminate by bringing it into a nip between two 0.5 mil aluminum foils in a nip roll laminator at 240° C. at a pressure of about 400 pounds per square inch.

Example 6 is then repeated, employing the product of the previous paragraph for the spiral wound shield in place of the laminate used in Example 6. Shielding of the primary conductors in particularly effective.

EXAMPLE 9

To both sides of a 1 mil polyimide film based on pyromellitic dianhydride and bis(4-aminophenyl) ether is applied a 0.375percent by weight solution of polyethylenimine in methanol and the film is dried. The amount of solution applied is such that there remains approximately 15 to 18 milligrams of polyethylenimine per square meter of film surface. One surface of a half-mil film of tetrafluoroethylene/hexafluoropropene copolymer is made cementable by treating according to McBride and Wolinski, Ser. No. 282,947, using glycidyl methacrylate as the organic vapor. A three-layer laminate is then prepared by bringing each side of the polyimide film into contact with the cementable surface of a portion of the treated fluorocarbon polymer film in a continuous laminate line at a speed of 10 feet per minute. In this laminating line the two films are brought together in a nip at a temperature which varies between 238° and 250° C., at a pressure of about 300 pounds per square inch, with a contact time in the nip of about 0.06 second. The three-layer laminate is then treated as described hereinabove to make one surface cementable. An 0.5 mil perfluorocarbon/1 mil polyimide/0.5 mil perfluorocarbon/3 mil aluminum/0.5 mil perfluorocarbon laminate is then prepared by bringing the cementable side of the perfluorocarbon/polyimide/perfluorocarbon laminate into contact with the 3 mil aluminum, while simultaneously bringing the cementable side of an 0.5 mil perfluorocarbon film into contact with the second side of the aluminum, in a nip roll laminator at 240° C. at a pressure of about 400 pounds per square inch.

A similar laminate is also prepared where the polyimide is 2 mils thick.

The above examples can be repeated substituting a copper sheet for the aluminum sheet with similarly satisfactory results.

The invention claimed is:

1. A shielded electrical conductor spiral wrapped with a bonded laminated tape structure composed, in turn, of layers of (1) a copolymer of 95 to 50 percent by weight of tetrafluoroethylene and 5 to 50 percent by weight of hexafluororpropylene, (2) a polyimide polymer, (3) a copolymer of 95 to 50 percent by weight of tetrafluoroethylene and 5 to 50 percent by weight of hexafluoropropylene and (4) a member selected from the group consisting of aluminum and copper foil, said first mentioned layer being in contact with said electrical conductor.

2. An electrical conductor according to claim 1 including a second wrapping of said laminated tape over said first wrapping thereof.

3. A five-layer bonded laminated structure, adapted for shielding insulation for cables, wherein each layer is 0.25 to 10 mils thick, the layers in turn being (1) a member selected from the group consisting of aluminum and copper foil, (2) a copolymer of 95–50 percent by weight of tetrafluoroethylene and 5%-50% by weight of hexafluoropropylene, (3) a polyimide polymer, (4) a copolymer of 95–50 percent by weight of tetrafluoroethylene and 5–50 percent by weight of hexafluoropropylene, and (5) a member selected from the group consisting of aluminum and copper foil.

* * * * *